Jan. 24, 1939.  F. P. MILLER  2,144,986
INSERTED BLADE CUTTER
Filed Nov. 19, 1935
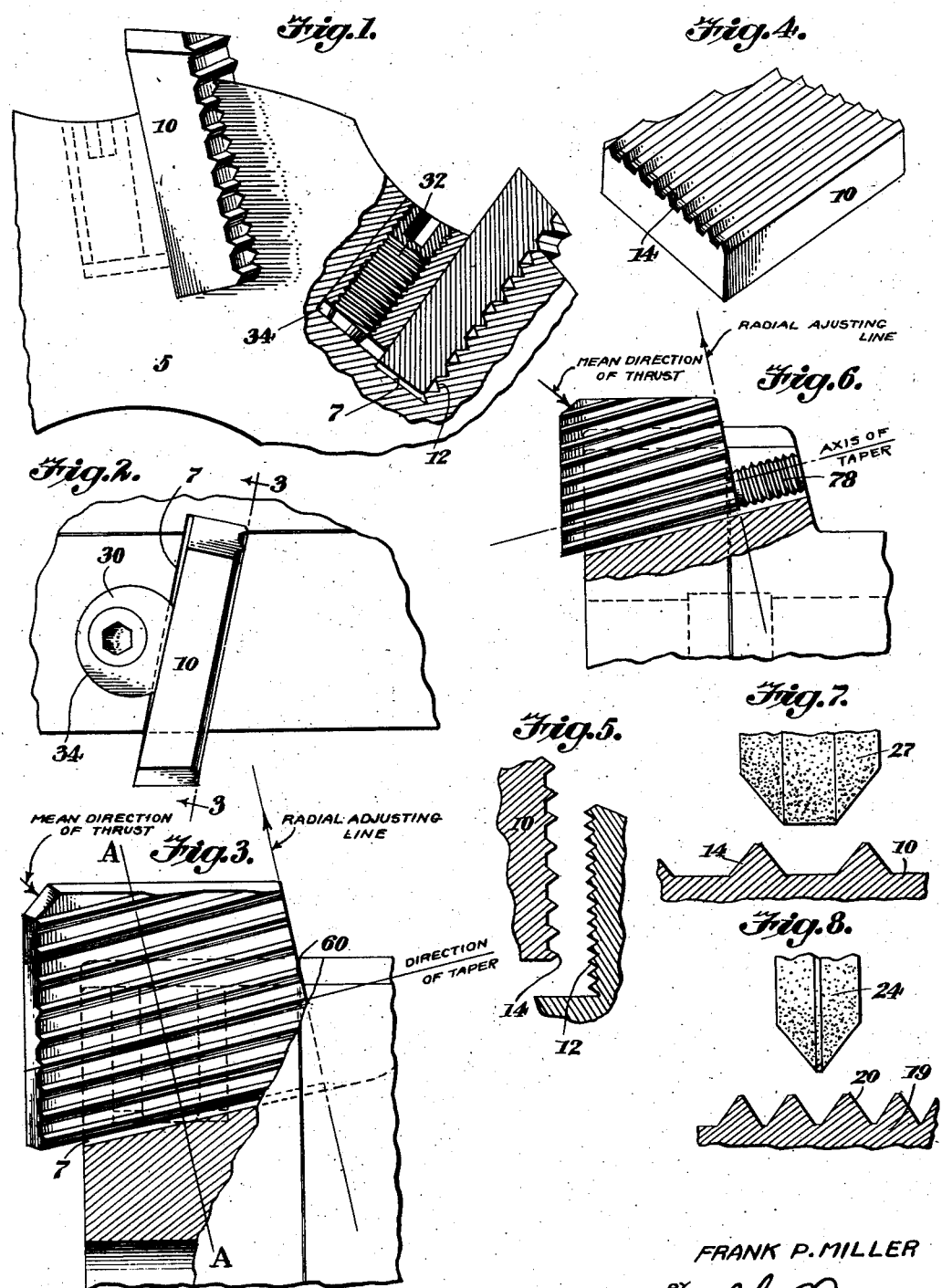
FRANK P. MILLER Patented Jan. 24, 1939

2,144,986

UNITED STATES PATENT OFFICE 2,144,986

INSERTED BLADE CUTTER

Frank P. Miller, Meadville, Pa.

Application November 19, 1935, Serial No. 50,584

15 Claims. (Cl. 29—105)

This invention relates to cutting tools of the inserted blade type and will be found to have special reference to an improved blade and the mounting thereof.

In working with tool steel to form serrations therein, it is customary to anneal or soften the steel to a point where it may be cut with a formed milling cutter, such as a hob, and then after the serrations have been cut, the metal is heat treated to produce the required hardness which leads to the statement that the formation of serrations in tool steel involves no particularly troublesome problem.

Unfortunately, the same cannot be said of tungsten carbide, Stellite and similarly hard alloys employed in the manufacture of blades for various cutting tools because these alloys cannot be annealed or softened and the vastly superior hardness of the same makes it impossible to mill serrations therein.

However, Stellite and other similarly hard alloys do yield to the abrasive effect of a grinding wheel but where the serrations are to be close together and possibly V-shaped, as in the case of a blade intended for cutting purposes, the grinding wheel must be maintained with a definitely thin and usually tapering grinding portion necessitating frequent interruptions in grinding for the purpose of redressing the wheel. This retards production and in addition the need for maintaining the required thin and usually tapering grinding portion has a limiting effect on the feeds and speeds allowed for this operation with the result that accelerated production is further obstructed.

With an appreciation of the foregoing, the invention forming the subject of this application will be found to feature an inserted blade cutter in which the blades of Stellite or some other very hard alloy are ground with serrations or ribs that are spaced sufficiently to allow of the use of a relatively broad grinding wheel thereby avoiding the need for frequent redressing of the grinding wheel and at the same time allowing heavier feeds and higher speeds, all of which quickens production and decreases the cost of manufacture.

In addition to aiding manufacture, the spacing of the serrations on the blades, as brought out herein, facilitates blade adjustment and at the same time provides for firm locking of the blades against the disturbing influences encountered in use.

Another aspect of the invention has to do with the mounting of a longitudinally tapered blade in a slot having longitudinally parallel side walls, in combination with a novel means for holding the blade in place regardless of its position of adjustment, attention in this regard being invited to the fact that it is much more economical to produce a blade receiving slot with longitudinally parallel side walls than it is to produce a tapering blade receiving slot, while on the other hand no special difficulties are involved in the manufacture of a blade that is tapered longitudinally.

The invention also provides a simple and accurate means for properly proportioned radial and endwise adjustment of the blades with a greater radial adjustment, of course, than forward adjustment because in the case of milling cutters as shown by the drawing it is on the peripheral portions of the blades that the greatest wear occurs and in addition, the invention will be found to provide for a variation in the ratio of endwise adjustment to radial adjustment as the occasion requires.

Other objects and advantages will be apparent during the course of the following description.

In the accompanying drawing forming a part of this application and in which like numerals are employed to designate like parts throughout the same, Figure 1 is a fragmentary front elevation of a rotary cutter embodying the invention, parts being shown in section, Figure 2 is a fragmentary plan view of the improved cutter, Figure 3 is a sectional view taken on line 3—3 of Figure 2, Figure 4 is a perspective of a blade embodied in the invention, Figure 5 is a detail sectional view through the carrier and a portion of one of the blades with the blade slightly separated from one side wall of a blade receiving slot to illustrate the spacing of the serrations of the blade with respect to the serrations in the associated side wall of the blade receiving slot, Figure 6 is a detail sectional view through a slightly modified form of cutter, Figure 7 is a detail sectional view through one of the blades in association with the means for grinding the serrations therein, Figure 8 is a detail sectional view through a now conventional blade in association with a grinding means for the serrations.

In the drawing, the numeral 5 designates a body having one or more slots 7 for the reception of blades 10.

As illustrated in Figure 1, one side wall and more particularly the back side wall of each slot 7 is provided with a plurality of parallel serrations or V-shaped teeth 12 located close together and coacting with complemental teeth 14 on the opposed side of the blade 10 in assisting in holding the blade in adjusted position.

As brought out in the opening paragraphs of this specification, some inserted cutting blades are made from a metal or alloy having a hardness so great that the same are not machineable and since such metals or alloys may not be annealed in preparation for forming serrations therein, the production of these serrations has been found to be a manufacturing problem of the first magnitude, especially since it is usually required, in cutting blades, that the serrations be located close together.

Thus, in forming V-shaped serrations in Stellite, tungsten carbide and similarly hard blades intended for cutting purposes, it is now customary to use a grinding wheel such as indicated by the numeral 24 in Figure 8. In this figure, the grinding wheel 24 is shown to have a thin tapering grinding portion for the formation of closely located V-shaped serrations in the blade 19. Clearly, the hardness of the blade 19 and the need for accuracy, requires that the grinding wheel 24 be maintained with the sharp grinding portion shown in Figure 8, with the result that it is frequently necessary to interrupt production for the purpose of redressing the grinding wheel. Further, the arrangement and formation of the teeth 20 and the shape of the grinding portion of the wheel 24 have a definitely limiting effect on the allowed speeds and feeds so that rapid production is further interfered with.

In looking to a simple and economical means by which serrations may be ground on the blade 10, while maintaining the effectiveness of such serrations, I have discovered that the serrations 14 of the blade 10 may be spaced twice as far apart as the serrations 12 in the back side wall of the slot so that the serrations of the blade fit in every other groove in the back wall of the slot and span the intervening groove. Otherwise expressed, the blade 10 is formed with a plurality of parallel serrations defining intervening grooves of widths sufficient to receive predetermined groups of complemental serrations in the opposed side wall of the slot.

In providing for generous spaces between the teeth 14 of the blade 10, I am enabled to use a grinding wheel 27 having a rather blunt and somewhat broad grinding portion as distinguished from the thin and tapering grinding portion of the wheel 24. This overcomes the need of frequent redressing of the grinding wheel and allows of the use of the heavier feeds and more rapid speeds that are so necessary to accelerated production.

In addition to facilitating production and reducing the cost of manufacture, the spacing of the serrations of the blade as disclosed herein provides for the expeditious blade adjustment as the occasion requires, it being explained in this connection that where the serrations on the blade are less in number than the serrations on the opposed side wall of the slot, there is less likelihood of confusion and mistake in the step-by-step adjustment of the blades. Of course, the proper adjustment of the tool requires that all the blades be adjusted coextensively and the omission of every other serration on the blade has been found to expedite such adjustment while at the same time there is left ample bearing between the serrations of the blades and the serrations of the side walls of the slots to permit the serrations to perform their full part in holding the blades in place.

Referring now to Figure 2, it will be seen that each slot 7 is provided with longitudinally parallel side walls while the blade in that slot is longitudinally tapered or is provided with walls which converge toward the rear ends thereof. The formation of a blade receiving slot with longitudinally parallel walls is a simple matter as compared to the production of a slot with longitudinally converging walls while on the other hand the manufacture of a blade with longitudinally converging walls is a simple matter.

To avail myself of the greater economy in the formation of a slot having longitudinally parallel side walls, such as are shown in Figure 2, and further to provide an improved locking means for the blade, I employ a segmental wedge 30 having a flat longitudinal side which bears against the blade regardless of its position of adjustment and which forces the back of the blade into firm thrust transmitting engagement with the back wall of the associated slot.

It is illustrated in Figure 1 that the wedge 30 is provided with a threaded bore extending axially of the wedge and receiving a lifting or set screw 32. The recess 34 has a side wall inclined toward the adjacent blade and functioning as a sort of cam in urging the wedge laterally into firm binding contact with the opposed side of the blade. The cylindrical form of that part of the wedge that is located in the similarly shaped recess 34 allows the wedge to rock or turn into firm and generous bearing contact with the opposed side of the blade so that by reason of the rearward taper of the blade, rearward shifting of the blade under the influence of the thrust thereon is positively inhibited. More particularly, the wedge 30 is mounted for rocking movement about its own axis so as to allow the wedge or more particularly the flat side wall thereof to come to a full and generous bearing against the opposed flat wall of the blade.

The wedge 30 and the screw 32 are not unlike the corresponding parts shown in my prior Patent No. 1,951,101 and the advance marked by this phase of the disclosure herein over the showing in my prior patent herein identified resides in the engagement of the wedge with a tapering blade that is mounted in a slot having longitudinally parallel side walls. In addition to exerting a lateral binding force on the blade, the wedge 30 acts against the longitudinal taper of the blade in securing the blade in place which leads to the statement that the wedge exerts a compound locking force on the blade. In other words, the taper of the blade acts in concert with the peculiar action of the wedge in locking the blade in place.

Referring now to the means by which I provide a proportioned radial and forward adjustment of the blade, attention is invited to Figure 3 in which it is illustrated that the radial adjusting line that is indicated as such is inclined forwardly or is at an acute angle to the longitudinal axis of the carrier and is at right angles to the bottom wall of the slot. The rear end of the blade is shown to cooperate with a peripheral or other line 60 on the carrier in indicating the position to which the blade should be set when making successive radial adjustments to accomplish a properly proportioned forward and radial adjustment of the blade. That is to say, when the blade is to be adjusted to compensate for wear it is stepped out possibly one serration and the rear end of the blade is brought back to the line 60 so that the blade will at the same time be moved forward. When the blade has been adjusted radially and the rear end thereof is set at the point or line 60, it will be found that the blade has been given a forward adjustment as well as a radial adjustment, this being true because of the indicated forward inclination of the rear end of the blade with respect to the axis of the tool.

In metal cutting tools of this character, the wear is principally on the peripheral surfaces of the blades while, of course, some wear is on the forward ends thereof. For example, it has been found that wear on the peripheral portions of the blades is, in many cases, five or six times as great as on the ends of the blades and the radial adjusting line as shown in Figure 3 is at the proper angle in relation to the axis of the carrier to produce the desired proportions of radial and axial adjustments.

When a back-up screw 78 is employed as shown in Figure 6, it may be advanced or retracted to vary the ratio of radial and forward adjustment of the associated blade. Of course, the back-up screw 78 provides a positive means of preventing rearward shifting of the blade and, in addition, provides a highly sensitive means of effecting desired endwise adjustment so that all blades can be adjusted to exactly the right point to bring the front cutting edges of all the blades in exactly the same plane. This is important in reducing the amount of metal to be removed in re-sharpening the blades and prevents unnecessary waste of the expensive blade material.

Referring again to Figure 3, it will be seen that the axis or direction of the taper of the blade 18 is indicated as such and is at right angles to the radial adjusting line so that the thickness of the wedge-engaging portion of the blade remains unchanged throughout the entire range of the radial blade adjustment. That is to say, notwithstanding repeated radial and forward adjustments of the blade and notwithstanding the fact that the blade is tapered from front to back, that part of the blade which is progressively presented to the wedge 30 is of a constant thickness regardless of the radial position of the blade, providing the blade is moved radially parallel with the radial adjusting line, as determined by the back end of the blade. This maintains the wedge in the same radial position for all radial positions of the associated blade. Thus, the top surface of the wedge can always be maintained in the proper relationship to the periphery of the carrier, the two surfaces being approximately flush to prevent any interference with the free movement of chips away from the blade.

Having thus described the invention, what is claimed is:

1. In a cutting tool, a body having a slot provided in one side wall thereof with a plurality of serrations, and a blade in said slot and having a plurality of serrations to interfit with the serrations in the side wall of the slot and having intervening grooves of a width to receive a plurality of the serrations in the side wall of the slot.

2. In an inserted blade cutting tool, a body having a slot provided with a plurality of serrations substantially V-shaped in cross-section defining intervening V-shaped grooves, and a blade in said slot and formed in one side wall with a plurality of serrations having intervening grooves substantially wider than the first-named grooves so that each groove in the blade receives a plurality of the serrations in the side wall of the slot.

3. In an inserted blade cutter, a body having a slot, and a blade in said slot and of a metal having a hardness superior to that of the material constituting the body, said blade and one side wall of the slot being formed with a plurality of interfitting serrations, the serrations in the blade being spaced sufficiently to define grooves of a width to receive pairs of the serrations in the side wall of the slot.

4. In an inserted blade cutter, a body having a slot formed with longitudinally parallel side walls, a blade in said slot and being tapered toward the rear end thereof, one side wall of the slot being provided with a cylindrical recess, a cylindrical wedge in said recess and having one longitudinal side thereof flat for firm bearing contact with the blade, and means associated with the wedge to rotatably support the same so that the flat side of the wedge may have broad bearing contact with the blade.

5. In an inserted blade cutter, a body having a slot formed with side walls, a blade in said slot and having walls that converge toward the rear end of the blade, one side wall of said slot being provided with a recess, a segmental wedge in said recess and having one longitudinal side thereof flat for engaging one of the converging sides of said blade, and means associated with said wedge to move the same to an operative position and at the same time to support the wedge for rocking movement to allow the said flat side of the wedge to have uniform contact with one of the converging sides of the blade.

6. In an inserted blade cutter, a body having a slot opening out through the periphery thereof, said slot being provided with a cylindrical recess also opening out through the periphery of the body, a cylindrical wedge having one side thereof flat, a blade in said slot and having side walls converging toward the rear end thereof, and means associated with said wedge to rotatably support the same so that the said flat side of the wedge may have uniform pressure contact throughout with one of the converging sides of the blade, said recess being provided with tapering side walls cooperating with said means in moving the wedge into binding engagement with the blade.

7. In an inserted blade cutting tool, a body having a plurality of blade receiving slots and an indicating means associated with said slots, and blades in said slots, said blades and said slots being provided with interfitting serrations defining a radial adjusting line at an acute angle to the radius of the body and parallel to the rear ends of the blades so that by bringing the rear ends of the blades against said indicating means as an incident to the step-by-step adjustment of the blades, a proportioned radial and forward adjustment of the blades is effected.

8. A blade for inserted blade cutters, said blade having on one side face thereof a plurality of parallel serrations spaced apart by grooves, each groove being of a width at the bottom equal to the maximum width of one or more serrations.

9. In combination with a blade holder having a plurality of spaced adjustment serrations, a blade in said holder and having spaced serrations meshing with the serrations on said holder, the spacing of said holder serrations providing for adjustment of the blade in a direction at substantially right angles to said serrations by increments equal to a fraction of the space between adjacent blade serrations.

10. In combination with a blade holder having a plurality of spaced adjustment serrations, a blade in said holder and having spaced serrations meshing with the serrations on said holder, the spacing of said blade serrations being such that two holder serrations are received between adjacent blade serrations, and the spacing of said holder serrations providing for adjustment of the blade in a direction at substantially right angles to said serrations by increments equal to one-half the space between adjacent blade serrations.

11. In an inserted blade cutting tool, a body having a slot, a blade in said slot, and a back-up screw carried by the body and engaging the rear end of said blade, said blade and said slot being provided with interfitting serrations, the rear end of said blade being inclined forwardly at an acute angle to the axis of said body and determining a direction of blade adjustment which will cause the blade to be moved radially a greater distance than axially as the blade is adjusted outwardly from one serration to another and brought into contact with said back-up screw.

12. In an inserted blade cutting tool, a body having a slot, a blade in said slot and a back-up screw positioned in said slot and engaging the rear end of said blade, said blade and said slot being provided with interfitting serrations, the rear end of said blade being inclined forwardly at an acute angle to the axis of said body and determining a direction of blade adjustment which will cause the blade to be moved radially a greater distance than axially as the blade is adjusted outwardly from one serration to another and brought into contact with said back-up screw, said back-up screw being adjustable to vary the ratio of radial and axial adjustment of said blade.

13. A serrated blade for inserted blade cutters comprising a body having on one side face thereof a plurality of parallel teeth spaced apart by grooves, each groove being approximately equal in cross-sectional area to the combined cross-sectional area of a plurality of said teeth.

14. A serrated blade for inserted blade cutters comprising a body provided on one side face thereof with a plurality of parallel teeth spaced apart by grooves, each groove being approximately equal in cross-sectional area to the combined cross-sectional area of three of said teeth.

15. A serrated blade for inserted blade cutters comprising a body having on one face thereof a plurality of spaced parallel V-shaped teeth, there being a groove between each pair of adjacent teeth having a cross-sectional area sufficient to receive two closely juxtaposed teeth of the same size as said blade teeth.

FRANK P. MILLER.